(12) United States Patent
Labhasetwar et al.

(10) Patent No.: US 6,656,872 B2
(45) Date of Patent: Dec. 2, 2003

(54) METHODS OF PRODUCING RUTHENIUM PEROVSKITE

(75) Inventors: Nitin Kumar Labhasetwar, Ibaraki (JP); Takefumi Mitsuhashi, Ibaraki (JP); Akio Watanabe, Ibaraki (JP)

(73) Assignee: National Institute for Materials Science, Tsukuba (JP)

( * ) Notice: Subject to any disclaimer, the term of this patent is extended or adjusted under 35 U.S.C. 154(b) by 31 days.

(21) Appl. No.: 10/076,642

(22) Filed: Feb. 19, 2002

(65) Prior Publication Data

US 2002/0114752 A1 Aug. 22, 2002

(30) Foreign Application Priority Data

Feb. 20, 2001 (JP) ........................................ 2001-042890

(51) Int. Cl.$^7$ ................................................. B01J 23/63
(52) U.S. Cl. ...................... 502/303; 502/325; 502/302; 502/328; 502/340; 423/263; 423/593.1
(58) Field of Search ............................ 423/263, 593.1; 502/303, 325, 302, 328, 340

(56) References Cited

U.S. PATENT DOCUMENTS

| | | | | |
|---|---|---|---|---|
| 4,140,655 A | * | 2/1979 | Chabot et al. | 502/303 |
| 4,182,694 A | * | 1/1980 | Lauder | 502/303 |
| 4,740,492 A | * | 4/1988 | Dyke | 502/304 |
| 5,318,937 A | * | 6/1994 | Jovanovic et al. | 502/303 |
| 5,380,692 A | * | 1/1995 | Nakatsuji et al. | 502/303 |
| 5,447,705 A | * | 9/1995 | Petit et al. | 423/418.2 |
| 2001/0053467 A1 | * | 12/2001 | Kaneko et al. | 429/19 |

FOREIGN PATENT DOCUMENTS

JP 61-33232 * 2/1986

* cited by examiner

Primary Examiner—M. Alexandra Elve
Assistant Examiner—Christine Ildebrando
(74) Attorney, Agent, or Firm—Oblon, Spivak, McClelland, Maier & Neustadt, P.C.

(57) ABSTRACT

Methods for producing ruthenium perovskite represented by a chemical formula $LaRuO_3$, wherein La is lanthanum to which twelve oxygen ions are coordinated, Ru is ruthenium to which six oxygen ions are coordinated, and O is oxygen, which comprises reacting an aqueous mixed metal ion solution containing metal ions of La and Ru with a precipitate-forming liquid in a reaction container to co-precipitate hydroxides of La and Ru, and subjecting the precipitate to a heat treatment. Alternatively, the co-precipitated mass is deposited on a suitable carrier and subsequently heated to form supported $LaRuO_3$. The co-precipitated La and Ru hydroxides can also be directly formed on a carrier by precipitation from a homogenous solution containing La, Ru and urea. This provides a uniform dispersion of co-precipitated hydroxides on a carrier, subsequent heating of which results in formation of supported $LaRuO_3$. The materials thus obtained are to be used as efficient catalysts for certain reactions of environmental importance. These synthesis methods can also be used for the improved synthesis of $LaRuO_3$ for other applications.

6 Claims, 3 Drawing Sheets

METHODS OF PRODUCING RUTHENIUM PEROVSKITE

The present invention relates to methods for producing ruthenium perovskite having high purity and high crystallinity and having large specific surface area, and ruthenium perovskite catalyst obtained by these methods.

As a synthesis method of $LaRuO_3$, which is a rare ruthenium perovskite type compound, composed of trivalent ruthenium ions, the following synthesis methods by solid phase reaction have been reported.

(1) $2La_2O_3+3RuO_2+Ru \rightarrow 4LaRuO_3$ (reaction conditions: at 1,350° C. for 48 hours and at 1,000° C. for 48 hours: J. Solid State Chem. 4,80,1972)

(2) $2La_2O_3+3RuO_2+Ru \rightarrow 4LaRuO_3$ (reaction conditions: under 2 GPa at 1,300° C. for 30 minutes: Mat.Res. Bull. 29,1271,1994)

With these solid phase reaction processes, some quantity of ruthenium metal and $RuO_2$ are often formed as by-products, and it is difficult to obtain high purity perovskite phase. Further, patents regarding production processes of said substance (including foreign countries' patents) are mostly based on the above processes.

There are following problems in conventional synthesis methods of ruthenium perovskite.

(1) The production process has to be carried out at a high temperature and tends to be complicated, and the process cost is high.

(2) The obtained product tends to have a small specific surface area, due to a solid phase reaction and high synthesis temperature.

(3) These methods result in lack of purity and dispersion of lanthanum ruthenium perovskite when synthesized on a catalyst carrier or another carrier.

(4) These previous methods do not offer good mixing and contact of precursors/reactive ions, and therefore these precursors often react with the support materials, leading to the formation of undesired phases.

(5) The adhesive strength of a catalyst on a catalyst carrier or another carrier tends to be weak in most of the cases.

The present inventors have developed novel synthesis methods of ruthenium perovskite, which overcome the above problems, and have found that $LaRuO_3$ having excellent physical and catalytic properties can be obtained by these methods.

Namely, the present invention provides a method for producing ruthenium perovskite represented by a chemical formula $LaRuO_3$, wherein La is lanthanum to which twelve oxygen ions are coordinated, Ru is ruthenium to which six oxygen ions are coordinated, and O is oxygen, which comprises reacting an aqueous mixed metal ion solution containing metal ions of La and Ru, with a precipitate-forming liquid in a reaction container to co-precipitate hydroxides of La and Ru, and subjecting the precipitate to a heat treatment.

The present invention further provides the above method for producing ruthenium perovskite, wherein the precipitate is deposited, adhered or coated on a catalyst carrier or another carrier and then subjected to a heat treatment to form a coating of $LaRuO_3$. The lanthanum and ruthenium metal in co-precipitated state offer close contacts with each other to form $LaRuO_3$, rather than reacting with the support material. This also reduces the possibility of ruthenium getting oxidized to a higher valance state during the synthesis of $LaRuO_3$.

The present invention further provides the above method for producing ruthenium perovskite, wherein the catalyst carrier or other carrier is coated with an alkaline earth oxide or a rare earth metal oxide.

The present invention further provides a method for producing ruthenium perovskite represented by a chemical formula $LaRuO_3$, wherein La is lanthanum to which twelve oxygen ions are coordinated, Ru is ruthenium to which six oxygen ions are coordinated, and O is oxygen, which comprises directly heating an aqueous mixed metal ion solution containing metal ions of La and Ru in a reaction container, followed by evaporation to dryness.

The present invention further provides the above method for producing ruthenium perovskite, wherein part of La in the chemical formula $LaRuO_3$ is replaced with another rare earth element.

The present invention further provides an innovative method to prepare a properly dispersed $LaRuO_3$ on a catalyst or other support, using a "deposition-precipitation" technique. This involves co-precipitation of La and Ru hydroxides on a support material, from a homogenous mixed metal ion solution, by slow and controlled decomposition of urea present in the same solution. The support containing co-precipitated precursors is subsequently heated to form a well dispersed $LaRuO_3$ on powder, honeycomb or other catalyst carriers.

The present invention still further provides a ruthenium perovskite catalyst which comprises ruthenium perovskite obtained by the above production methods, which is used as a catalyst for oxidation reaction of hydrocarbon accompanied by no generation of carbon monoxide, as a catalyst for an oxidation reaction of carbon monoxide or as a catalyst for reduction reaction of NOx by carbon monoxide or hydrocarbon.

The production method of the present invention is roughly represented by the following reaction formulae. Here, in the following formulae, A is an anion component of a water-soluble material such as lanthanum or ruthenium, L is a precipitate-forming agent such as ammonia, sodium carbonate, potassium carbonate, urea or NaOH, and R is a residual component of the precipitate-forming agent.

Step of co-precipitation: $La^{3+}+Ru^{3+}+A+L+H_2O \rightarrow La.Ru.O.H.R$ (co-precipitated product, paste-like amorphous hydroxide)

Step of evaporation to dryness: $La.Ru.O.H.R \rightarrow La.Ru.O.H_2O$ (solid amorphous)

Step of dehydration and crystallization by a heat treatment: $La.Ru.O.H_2O \rightarrow LaRuO_3$ (perovskite crystal)

Step of particle size control and stabilization of crystal particles by a heat treatment at a high temperature: $LaRuO_3 \rightarrow LaRuO_3$ The synthesis method of ruthenium perovskite of the present invention has the following characteristics as compared with conventional methods.

1) It can be carried out with relatively less process time and at lower temperature, thereby lowering the production cost.

2) A material having relatively large specific surface area and having good purity and crystallinity can be obtained.

3) A material can be directly synthesized with better purity, on a catalyst carrier or another carrier. Some of these methods offer reduced reactivity of precursors towards the catalyst carrier thereby producing supported $LaRuO_3$ with better purity.

4) $LaRuO_3$ material uniformly and minutely dispersed on a catalyst carrier or another carrier can be synthesized.

5) $LaRuO_3$ more strongly adhered to a catalyst carrier or another carrier can be synthesized.

6) A material retaining a large specific surface area even after the carrier treatment, useful as a catalyst or for other applications, can be synthesized.

7) $LaRuO_3$ having excellent catalytic properties for oxidation catalytic reaction of carbon monoxide or hydrocarbon or volatile organic compounds (VOCs) in the air or in exhaust gas; and for redox catalytic reactions of NOx by hydrocarbon or carbon monoxide, can be synthesized.

The ruthenium perovskite obtained by the production method of the present invention is useful, for example, for the following applications.

1) Removal of carbon monoxide and hydrocarbon discharged from gasoline engine or other sources, by oxidation catalytic action.

2) Removal of NOx discharged from gasoline engine or other sources, by hydrocarbon or carbon monoxide with a low temperature redox catalytic action.

3) Removal of volatile organic compounds(VOCs) from different sources, by catalytic oxidation reaction.

4) Clarification of the above air pollutants contained in the air by the above actions.

5) Preparation of supported and unsupported $LaRuO_3$ for applications other than catalysis.

Now, the present invention will be described in detail with reference to the preferred embodiments.

Figure 1:
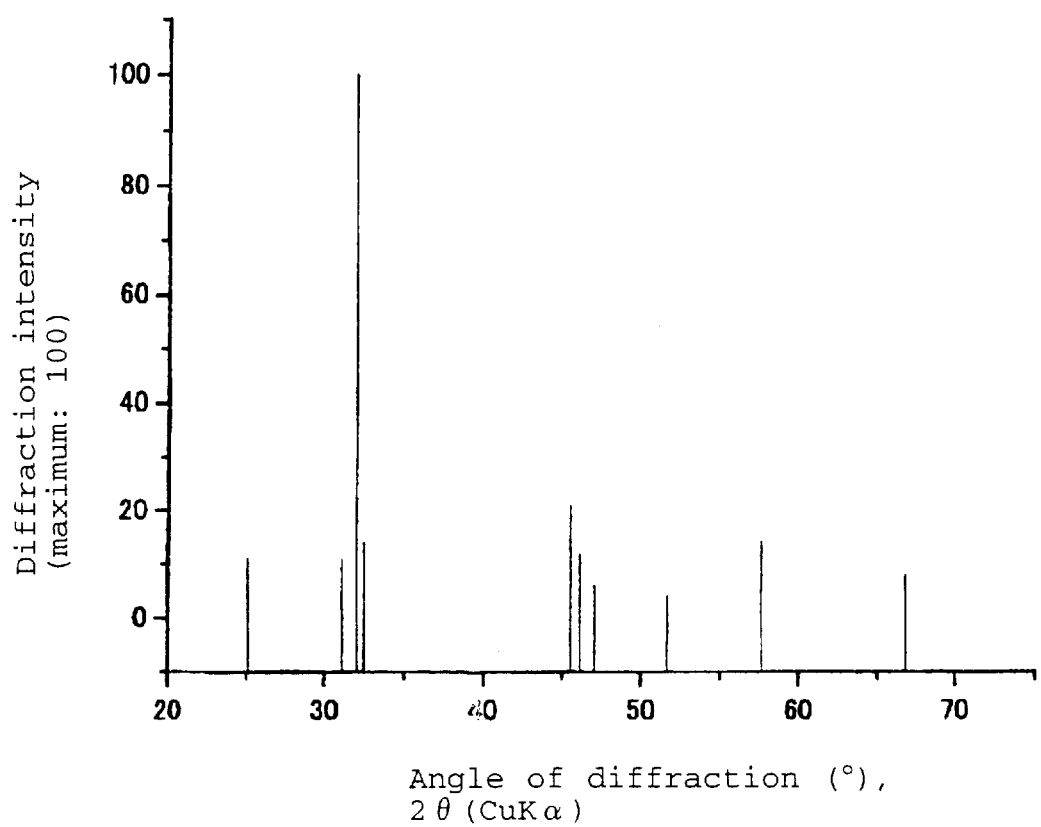
FIG. 1 is a graph illustrating a powder X-ray diffraction data of $LaRuO_3$ synthesized in Example 1.

Now, the steps of the production method of $LaRuO_3$ of the present invention will be described below.

Firstly, precursors of $La^{3+}$ and $Ru^{3+}$ are dissolved in water and mixed. Here, the precursors are water-soluble lanthanum and ruthenium compounds. As the precursors, nitrates and oxalates, in addition to chlorides, may, for example, be used, but preferred are chlorides ($LaCl_3$, $RuCl_3$), which are easily available at a relatively low cost.

An alkaline aqueous solution of e.g. ammonia water, sodium carbonate, potassium carbonate, urea or NaOH, as a precipitate-forming liquid, is slowly added to the mixed solution with stirring at a constant rate, for co-precipitation. It is preferred to use ammonia or urea since there is a possibility that the alkali metal remains with the precipitate, although its amount is minute.

After the precipitate settles, filtration and washing are carried out. The precipitate is dried under vacuum or heated to a level of from 40 to 70° C. in an oven, then heated in an atmosphere of nitrogen at from 300 to 600° C. for 2 to 8 hours. The obtained dried product is grinded or pulverized and reheated at from 600 to 1,050° C. for 1 to 12 hours. The heating is carried out in two stages, since if the precipitate is directly heated to a high temperature, extraordinary particle growth or deviation in the composition of the crystal (a possibility that $Ru_2O$ or Ru metal form in this reaction) may take place, whereby it tends to be difficult to obtain high purity crystals having larger surface area. The obtained product shows a specific surface area of from 2.0 to 6.0 $m^2/g$ as measured by a BET method.

Part of La in the chemical formula $LaRuO_3$ may be replaced with another rare earth element. The mixed solution may be evaporated to dryness instead of conducting the above co-precipitation.

The step of coating a cordierite carrier or an alumina powder carrier with the $LaRuO_3$ precursor will be described below. The precursors of $La^{3+}$ and $Ru^{3+}$ are dissolved in water and mixed. A cordierite carrier or an alumina powder carrier (which is preliminarily coated with an alkaline earth oxide or a rare earth oxide) is impregnated with the mixed solution, and then dried in an atmosphere of nitrogen. Alternatively the co-precipitated slurry can be deposited on cordierite honeycomb or other support by repeated dipping and removal of excess slurry by applying compressed air. This process is carried out repeatedly, until a predetermined amount is loaded. Deposition of co-precipitated precursor can also be achieved by the following "deposition-precipitation" method based on the principle of "precipitation from homogenous solution". The carrier is then heated in an atmosphere of nitrogen or helium at from 300 to 600° C. for from 1 to 8 hours. Then, it is reheated at from 600 to 1,050° C. for from 1 to 12 hours. By this method $LaRuO_3$, which is dispersed and adhered on the carrier can be obtained.

Now, the present invention will be described in detail with reference to Examples. However, it should be understood that the present invention is by no means restricted to such specific Examples.

EXAMPLE 1

200 ml of a lanthanum trichloride solution containing 4.8 g of La, 200 ml of a ruthenium trichloride solution containing 3.5 g of Ru and 100 ml of deionized water were mixed to prepare 500 ml of a mixed ion solution. While stirring the mixed solution at a constant rate of 100 revolutions per minute, 850 ml of 2N ammonia water as a precipitate-forming liquid was slowly added thereto in a rate of 50 ml per minute to form a precipitate by co-precipitation.

The precipitate was left to stand for 5 hours, and then subjected to filtration and washing. Then, the precipitate was dried in an oven at 60° C. for 6 hours, and then heated in an atmosphere of nitrogen at 500° C. for 6 hours. The obtained dried product was grinded/pulverized until at least 90% thereof had a size of at most 10 $\mu$m, and then reheated in an atmosphere of nitrogen at 850° C. for 10 hours to form a final product. The product thus obtained was analyzed by XRD, BET-surface area measurement and chemical analysis. FIG. 1 is a graph illustrating the powder X-ray diffraction pattern of the obtained product. As illustrated in FIG. 1, a powder X-ray diffraction pattern characteristic of $LaRuO_3$ was obtained. Further, the obtained product shows a specific surface area of about 5 $m^2/g$.

Figure 2:
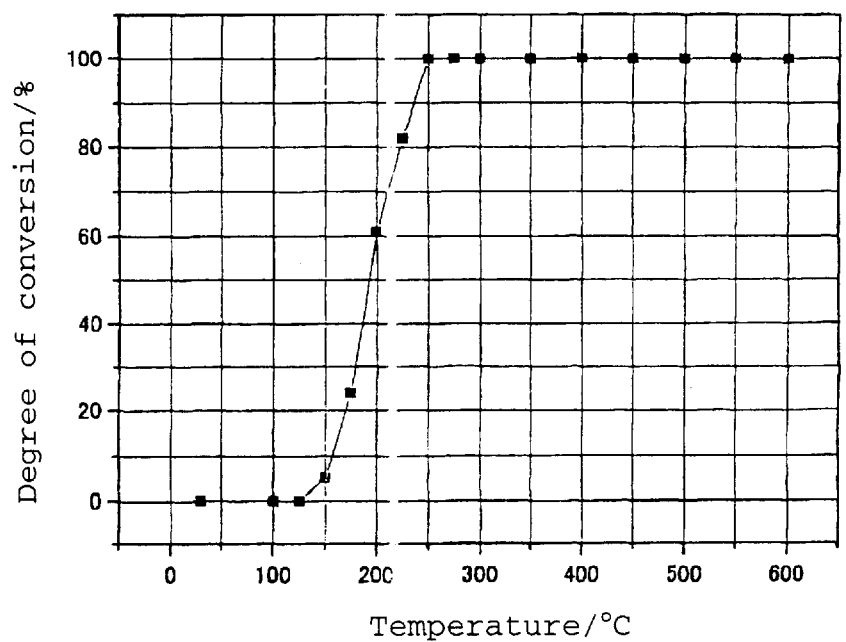
FIG. 2 is a graph illustrating a degree of conversion by oxidation of a hydrocarbon on $LaRuO_3$ synthesized in Example 1.
Figure 4:
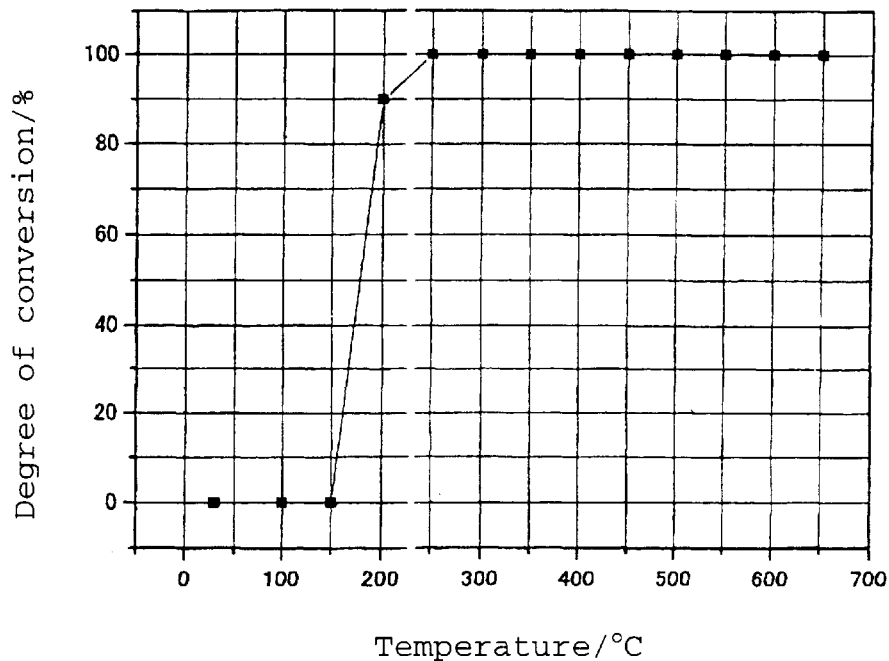
FIG. 4 is a graph illustrating a degree of conversion by reduction of NOx by a hydrocarbon on $LaRuO_3$ synthesized in Example 1.
Figure 5:
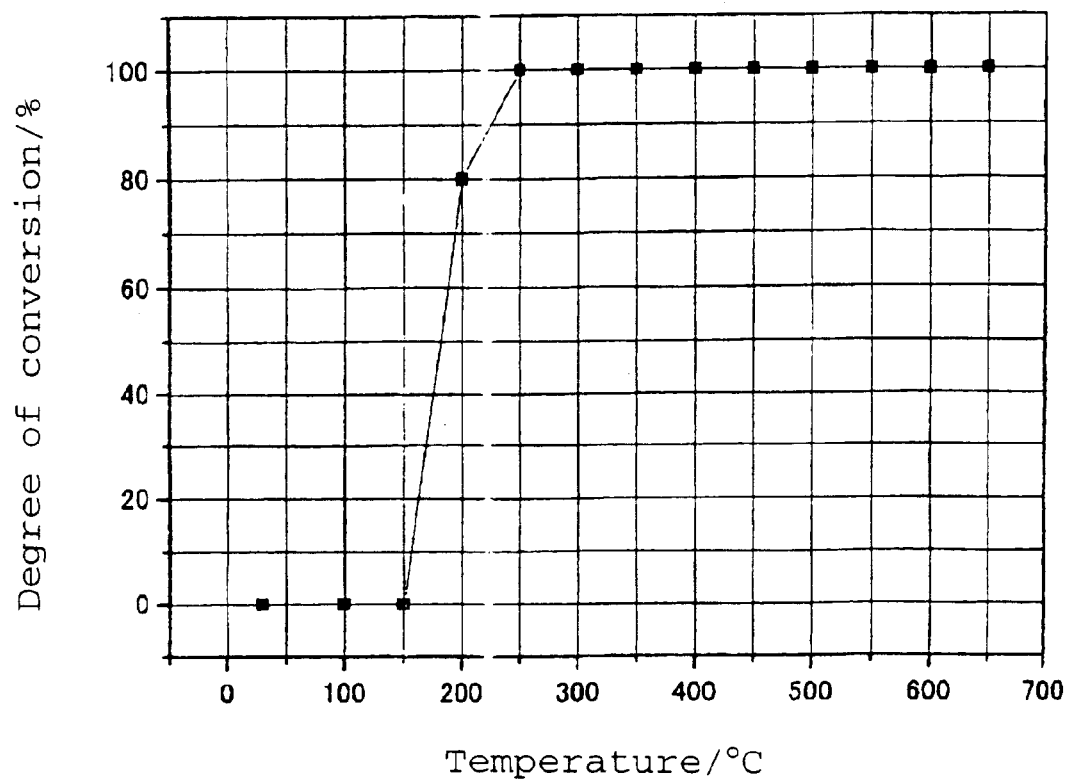
FIG. 5 is a graph illustrating a degree of conversion by reduction of NOx by carbon monoxide on $LaRuO_3$ synthesized in Example 1.

With respect to the obtained product, a catalytic experiment was conducted by means of a flow type catalytic reaction apparatus. Gases of a reaction system and a product system were analyzed by gas chromatography and other methods. FIG. 2 is a graph illustrating a degree of conversion by oxidation of a hydrocarbon on the obtained $LaRuO_3$, FIG. 3 is a graph illustrating a degree of conversion by oxidation of carbon monoxide on the obtained $LaRuO_3$, FIG. 4 is a graph illustrating a degree of conversion by reduction of NOx by a hydrocarbon on the obtained $LaRuO_3$, and FIG. 5 is a graph illustrating a degree of conversion by reduction of NOx by carbon monoxide on the obtained $LaRuO_3$.

Figure 3:
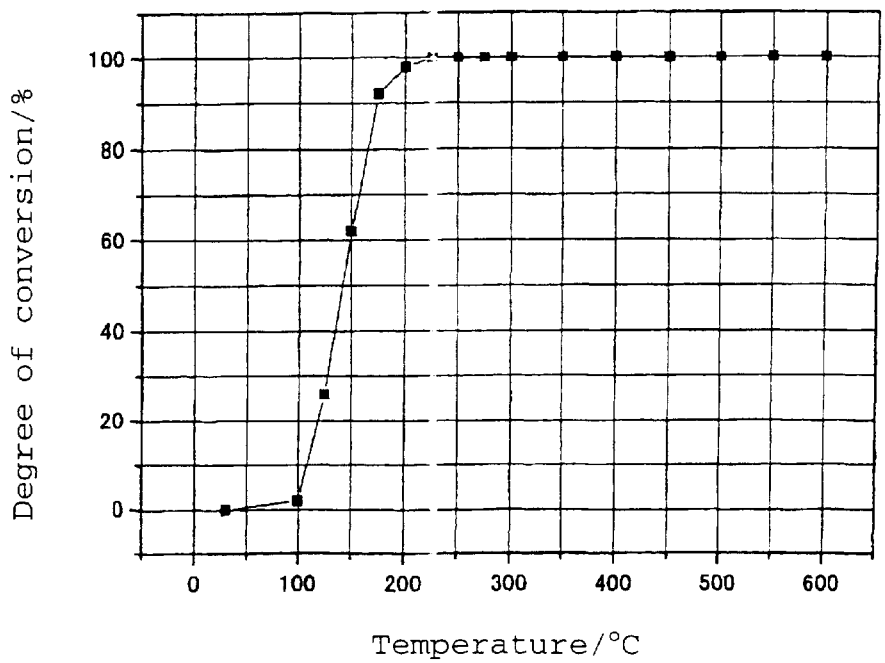
FIG. 3 is a graph illustrating a degree of conversion by oxidation of carbon monoxide on $LaRuO_3$ synthesized in Example 1.

As illustrated in FIGS. 2 and 3, the obtained product showed excellent catalytic properties for an oxidation reaction of HC (without formation of CO) and an oxidation reaction of CO. Further, as illustrated in FIGS. 4 and 5, this substance showed excellent catalytic properties at a lower temperature for reduction reactions of NOx by a hydrocarbon and carbon monoxide.

EXAMPLE 2

The same mixed solution as in Example 1 was evaporated to dryness by heating to 50° C. (or alternatively by freeze drying method), and the obtained solid was heated in an atmosphere of nitrogen at 500° C. for 4 hours. The obtained solid was pulverized until 90% thereof had a size of at most 10 $\mu$m, and again heated at 950° C. for 12 hours. By this method, $LaRuO_3$ having excellent catalytic properties was obtained in the same manner as in Example 1.

EXAMPLE 3

Water was added to 62.5 g of the same precipitate as in Example 1 to prepare 250 ml of slurry. A honeycomb made of cordierite having a channel density of 200 cpsi (pre-coated with about 10 wt % cerium oxide or 20 wt % lanthanum oxide) was impregnated with the slurry, and then excess slurry in the channel was removed by applying compressed air.

The obtained product was dried by heating at 60° C., for 6 hours, in air medium. This process comprising impregnation with the slurry and drying was repeated three times, and the dried precipitate was loaded in an amount of 5–20 wt % based on the honeycomb. Then, the product was heated in an atmosphere of nitrogen at 800° C. for 12 hours. By this method, $LaRuO_3$ having larger specific surface area and excellent catalytic properties, which was uniformly dispersed and adhered to the carrier, was obtained.

EXAMPLE 4

The same mixed solution as in Example 1 was diluted with 1,000 ml of pure water. This solution was infiltrated into 200 g of an alumina powder carrier (pre-coated with lanthanum oxide in an amount of about 5–30 wt % based on the alumina powder) and dried at 50° C. The operation comprising infiltration and drying was repeated 10 times.

The obtained product was heated in an atmosphere of nitrogen at 600° C. for 6 hours. It was further heated at 850° C. for 12 hours. By this operation, the amount of $LaRuO_3$ coated on the alumina powder carrier became 5.4 g, and the specific surface area became 90 $m^2/g$. By this method, $LaRuO_3$ having a large specific surface area and excellent catalytic properties, which was uniformly dispersed and adhered to the carrier, was obtained.

EXAMPLE 5

The same mixed solution as in Example 1 was diluted with 1,000 ml of pure water. This solution was infiltrated into a cordierite honeycomb carrier having a channel density of 400 cpsi and a volume of 400 $cm^3$ (wash-coated with 40 g of alumina powder, and subsequently coated with 20–40 g of lanthanum oxide) and dried at 50° C. The operation comprising infiltration and drying was repeated 10 times.

The obtained product was heated in an atmosphere of nitrogen at 600° C. for 6 hours. It was further heated at 850° C. for 12 hours. By this operation, the amount of $LaRuO_3$ coated on the honeycomb carrier became about 2.0 g, and the specific surface area became 15 $m^2/g$. By this method, $LaRuO_3$ having a relatively large specific surface area, which was uniformly dispersed and adhered to the honeycomb carrier, was obtained. The premixing of precursor metal ions help achieving their better contact and therefore facilitate the formation of $LaRuO_3$ perovskite phase.

EXAMPLE 6

200 ml of Lanthanum tri-chloride solution containing 0.96465 gm lanthanum and 200 ml of ruthenium tri-chloride solution containing 0.70203 gm ruthenium were mixed to prepare a mixed metal ion solution. 10 gm of alumina powder pre-coated with 25 wt % of lanthanum oxide was dispersed in this solution. 25 gm of urea was also added to this mixture and temperature was slowly raised to 90° C. This was kept for 3 hrs with constant stirring (about 50 rpm). This precipitation was carried out preferably but not necessarily under the nitrogen or inert atmosphere to avoid Ru oxidation. The mixed hydroxides of lanthanum and ruthenium slowly got precipitated and deposited on alumina. The alumina powder was then separated, washed with de-ionized water and dried in an oven at 70° C. for 4 hrs. Subsequently, this powder was heated at 900° C. for 10 hrs under the nitrogen atmosphere to produce $LaRuO_3$ on alumina powder. The BET surface area shows a value of 68 $m^2/gm$. The same method can also be used similarly for preparing $LaRuO_3$ cordierite or washcoated cordierite honeycomb supports having a pre-coat of lanthanum oxide.

According to the present invention, a catalyst capable of removing NOx, CO, hydrocarbon or VOCs which has to be promptly dealt with as environmental pollutants, at a relatively low temperature with a high efficiency, can be provided.

The entire disclosure of Japanese Patent Application No. 2001-042890 filed on Feb. 20, 2001 including specifications, claims, drawings and summary are incorporated herein by reference in its entirety.

What is claimed is:

1. A method for producing ruthenium perovskite represented by a chemical formula $LaRuO_3$, wherein La is lanthanum to which twelve oxygen ions are coordinated, Ru is ruthenium to which six oxygen ions are coordinated, and O is oxygen, which comprises reacting an aqueous mixed metal ion solution containing metal ions of La and Ru, with a precipitate-forming liquid in a reaction container to co-precipitate hydroxides of La and Ru, and subjecting the precipitate to a heat treatment.

2. The method for producing supported ruthenium perovskite according to claim 1, wherein the precipitate is deposited, adhered or coated on a catalyst carrier or another carrier and then subjected to a heat treatment to form a coating of $LaRuO_3$.

3. The method for producing supported ruthenium perovskite according to claim 2, wherein the catalyst carrier or the other carrier is coated with an alkaline earth oxide and/or a rare earth metal oxide.

4. A method for producing ruthenium perovskite represented by a chemical formula $LaRuO_3$, wherein La is lanthanum to which twelve oxygen ions are coordinated, Ru is ruthenium to which six oxygen ions are coordinated, and O is oxygen, which comprises directly heating an aqueous mixed metal ion solution containing metal ions of La and Ru in a reaction container, followed by evaporation to dryness.

5. The method for producing ruthenium perovskite according to any one of claims 1 to 4, wherein part of La in the chemical formula $LaRuO_3$ is replaced with another rare earth element.

6. A method for producing finely dispersed supported ruthenium perovskite represented by a chemical formula $LaRuO_3$, which comprises reacting an aqueous mixed metal ion solution containing metal ions of La and Ru, with a precipitate-forming agent produced in-situ by decomposition of urea present in the same solution, to co-precipitate hydroxides of La and Ru on a catalyst carrier or other carrier and then subjecting to a heat treatment.

* * * * *